(12) United States Patent
Howell et al.

(10) Patent No.: US 7,747,568 B2
(45) Date of Patent: Jun. 29, 2010

(54) INTEGRATED USER INTERFACE

(75) Inventors: David Howell, Seattle, WA (US); David Milstein, Redmond, WA (US); Kuansan Wang, Bellevue, WA (US); Linda Criddle, Kirkland, WA (US); Michael D Malueg, Renton, WA (US); Scott Forbes, Redmond, WA (US); Gursharan Sidhu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 11/400,612

(22) Filed: Apr. 7, 2006

(65) Prior Publication Data

US 2007/0239685 A1 Oct. 11, 2007

(51) Int. Cl.
*G06F 17/30* (2006.01)
*G06F 17/00* (2006.01)

(52) U.S. Cl. .................. 707/610; 707/999.003; 707/999.004; 707/999.01

(58) Field of Classification Search ............ None
See application file for complete search history.

(56) References Cited

U.S. PATENT DOCUMENTS

| | | | | |
|---|---|---|---|---|
| 5,884,032 | A * | 3/1999 | Bateman et al. | 709/204 |
| 6,442,547 | B1 * | 8/2002 | Bowman-Amuah | 707/10 |
| 6,671,355 | B1 | 12/2003 | Spielman et al. | 379/88.12 |
| 6,704,303 | B1 | 3/2004 | Bowman-Amuah | 370/352 |
| 7,231,404 | B2 * | 6/2007 | Paila et al. | 707/104.1 |
| 7,376,129 | B2 * | 5/2008 | Acharya et al. | 370/352 |
| 7,426,538 | B2 * | 9/2008 | Bodin et al. | 709/204 |
| 2002/0035474 | A1 | 3/2002 | Alpdemir | 704/270 |
| 2002/0085696 | A1 | 7/2002 | Martin et al. | 379/201.03 |
| 2003/0172175 | A1 | 9/2003 | McCormack et al. | 709/232 |
| 2003/0215078 | A1 | 11/2003 | Brahm et al. | 379/211.02 |
| 2004/0141508 | A1 | 7/2004 | Schoeneberger et al. | 370/401 |
| 2005/0039216 | A1 | 2/2005 | Oota | 725/111 |
| 2005/0044197 | A1 | 2/2005 | Lai | 709/223 |
| 2005/0281284 | A1 | 12/2005 | Shim et al. | 370/465 |

(Continued)

FOREIGN PATENT DOCUMENTS

EP 1 107 549 6/2001

(Continued)

OTHER PUBLICATIONS

U.S. Appl. No. 11/444,746 entitled "Metadata Collection" filed May 31, 2006.

(Continued)

*Primary Examiner*—Yicun Wu
(74) *Attorney, Agent, or Firm*—Merchant & Gould, P.C.

(57) ABSTRACT

A method and system for collecting contextual information in order to provide a requested service is provided. A service provider and a user may exchange a conversation and/or contextual information relating to a service over a communication channel. Based on the received user contextual information, the server may determine an appropriate source for obtaining more information relating to the requested service from the user. The server contacts the appropriate source and obtains information from it. Additionally, the server identifies the user interfaces for collecting more information relating to the requested service from the user. The server may transmit a set of contextual information, such as embedded instructions for invoking the user interfaces on a user's device, over the communication channel. While the user interacts with the user interfaces, new user's contextual information may be obtained by the server.

20 Claims, 18 Drawing Sheets

U.S. PATENT DOCUMENTS

| | | | |
|---|---|---|---|
| 2005/0286711 A1 | 12/2005 | Lee et al. | 379/399.01 |
| 2007/0230443 A1 | 10/2007 | Milstein et al. | 370/352 |
| 2007/0265830 A1 | 11/2007 | Sidhu et al. | 704/9 |
| 2007/0265990 A1 | 11/2007 | Sidhu et al. | 705/418 |
| 2007/0280204 A1 | 12/2007 | Howell et al. | 370/352 |
| 2008/0052400 A1* | 2/2008 | Ekberg | 709/227 |
| 2008/0101339 A1 | 5/2008 | Forbes et al. | 370/352 |

FOREIGN PATENT DOCUMENTS

| | | |
|---|---|---|
| EP | 1 548 997 | 6/2005 |

OTHER PUBLICATIONS

AudioTX Communicator, "What is Communicator?" ISDN Codec and Audio over IP Network Software Solution; accessed Jun. 2, 2006 at http://www.audiotx.com/main.html.

Cisco Systems, "IP Phones for all Business Environments," Cisco 7900Series IP Phones—Products and Services—Cisco Systems, access Feb. 2, 2006 at http://www.cisco.com/en/US/products/hw/phones/ps379.index.html.

Office Action dated Apr. 1, 2010, issued in U.S. Appl. No. 11/444,746.

Office Action dated Feb. 2, 2010, issued in U.S. Appl. No. 11/432,163.

Office Action dated Jun. 9, 2009, issued in U.S. Appl. No. 11/444,746.

Office Action dated Nov. 28, 2008, issued in U.S. Appl. No. 11/444,746.

Office Action dated Sep. 29, 2009, issued in U.S. Appl. No. 11/444,746.

* cited by examiner

INTEGRATED USER INTERFACE

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, the current VoIP approach may not provide a way to integrate various user interfaces for collecting user contextual information which will be used to provide the enhanced calling features and advanced services.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for collecting contextual information in order to provide a requested service is provided. A service provider and a user may exchange a conversation and/or contextual information relating to a service over a communication channel. Based on the received user contextual information, the server may determine an appropriate source for obtaining more information relating to the requested service from the user. The server contacts the appropriate source and obtains information from it. Additionally, the server identifies the user interfaces for collecting more information relating to the requested service from the user. The server may transmit a set of contextual information, such as embedded instructions for invoking the user interfaces on a user's device, over the communication channel. While the user interacts with the user interfaces, new user's contextual information may be obtained by the server.

In accordance with an aspect of the invention, a method for collecting contextual information relating to a service provided over a communication channel is provided. A request for a desired service is received. Upon receipt of the request, a set of user's contextual information may be obtained. Based on the obtained user contextual information, the service provider may identify a set of additional information which may be needed for providing the desired service. The service provider may select an information providing party where the set of additional information is to be collected and/or obtained. If the selected information providing party is a third party service provider, an inquiry for the additional user information may be sent to the third party service provider. If the user is selected as the information providing party, a set of provider contextual information may be identified for collecting the additional set of information and the identified provider contextual information may be transmitted.

In an aspect of the method, the identified provider contextual information is utilized within Voice over Internet Protocol devices of the user in order to retrieve the additional set of information. The identified provider contextual information may correspond to a first set of user interfaces, which the service provider has identified based on the obtained user's contextual information, the requested service, and the like. In response to user interactions with the first set of user interfaces, additional user contextual information relating to the user interactions may be collected. If necessary, additional provider contextual information corresponding to a second set of user interfaces may be transmitted, which has been tailored based on the previously collected user contextual information via the first set of user interfaces.

In accordance with another aspect of the invention, a computer-readable medium having computer-executable components for collecting contextual information over a communication channel between a user and a service provider. The computer-executable components include an interface component for identifying user contextual information relating to a service requested by the user, determining an information providing party for obtaining the identified user contextual information, and obtaining the identified user contextual information from the determined information providing party. The computer-executable components further include a routing component for determining a responding party for the user request and forwarding the obtained user contextual information to the responding party. The interface component transmits a request for obtaining the identified user contextual information to the determined information providing party. The interface component detects and obtains changes in user contextual information. The routing component selects another responding party if the changes in user contextual information indicate undesirability of the responding party currently communicating with the user.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system for collecting information relating to a service requested by a VoIP client or other service providers over a communication channel. More specifically, the present invention relates to a method and system for identifying contextual information, in response to a request for a service, and collecting the identified contextual information represented according to "structured hierarchies." "Structured hierarchies," as used herein, are predefined organizational structures for arranging contextual information to be exchanged between two or more VoIP devices. For example, structured hierarchies may be XML namespaces. Further, a VoIP conversation is a data stream of information related to a conversation, such as contextual information and voice information, exchanged over a conversation channel. Suitable user interfaces adaptive to contextual information may be utilized to collect further contextual information. Although the present invention will be described with relation to illustrative structured hierarchies and an IP telephony environment, one skilled in the relevant art will appreciate that the disclosed embodiments are illustrative in nature and should not be construed as limiting.

Figure 1:
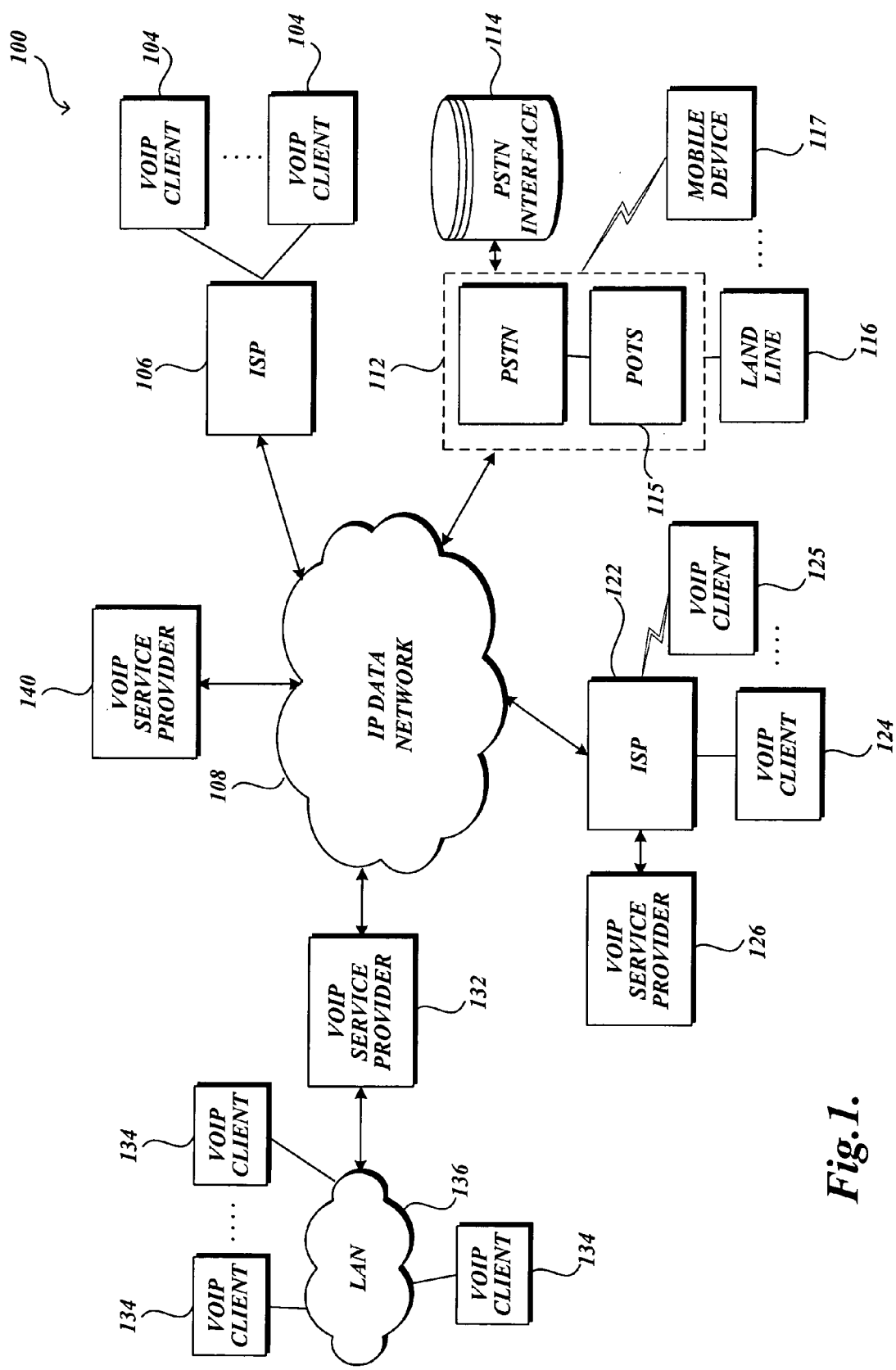
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of priority information (e.g., provider priority list) for individuals communicating in a call conversation. The VoIP service providers 126, 132, 140 may determined and assign an appropriate priority level to data packets based on priority information provided by VoIP clients 104, 124, 125, 136 in conjunction with the provider priority list.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116, may request a connection with the VoIP client based on the unique identifier of that client, and the appropriate VoIP device associated with the VoIP client will be used to establish a connection. In one example, an individual associated with the VoIP client may specify which devices are to be used in connecting a call based on a variety of conditions (e.g., connection based on the calling party, the time of day, etc.).

It is understood that the above-mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
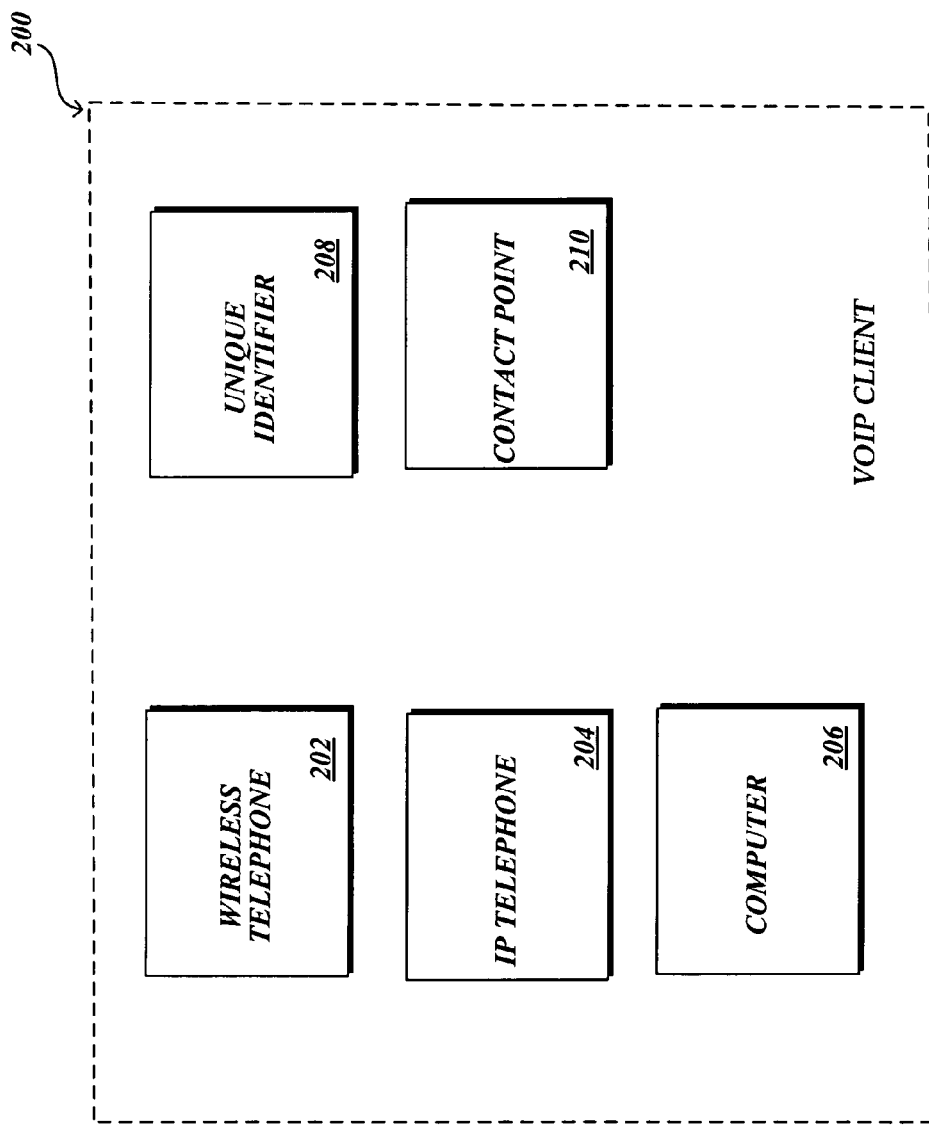
FIG. 2 is a block diagram illustrative of a VoIP client in accordance with an aspect of the present invention.

Referring now to FIG. 2, a block diagram illustrating an exemplary VoIP client 200 that includes several VoIP devices and a unique client identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique client identifiers 208. The unique client identifier(s) 208 may be constant or change over time. For example, the unique identifier(s) 208 may change with each call. The unique client identifier is used to identify the client and to connect with the contact point 210 associated with the VoIP client. The unique client identifier may be maintained on each VoIP device included in the VoIP client and/or maintained by a service provider that includes an association with each VoIP device included in the VoIP client. In the instance in which the unique client identifier is maintained by a service provider, the service provider may include information about each associated VoIP device and knowledge as to which device(s) to connect for incoming communications. In an alternative embodiment, the VoIP client 200 may maintain multiple client identifiers. In this embodiment, a unique client identifier may be temporarily assigned to the VoIP client 200 for each call session.

The unique client identifier may be used similar to a telephone number in PSTN. However, instead of dialing a typical telephone number to ring a specific PSTN device, such as a home phone, the unique client identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
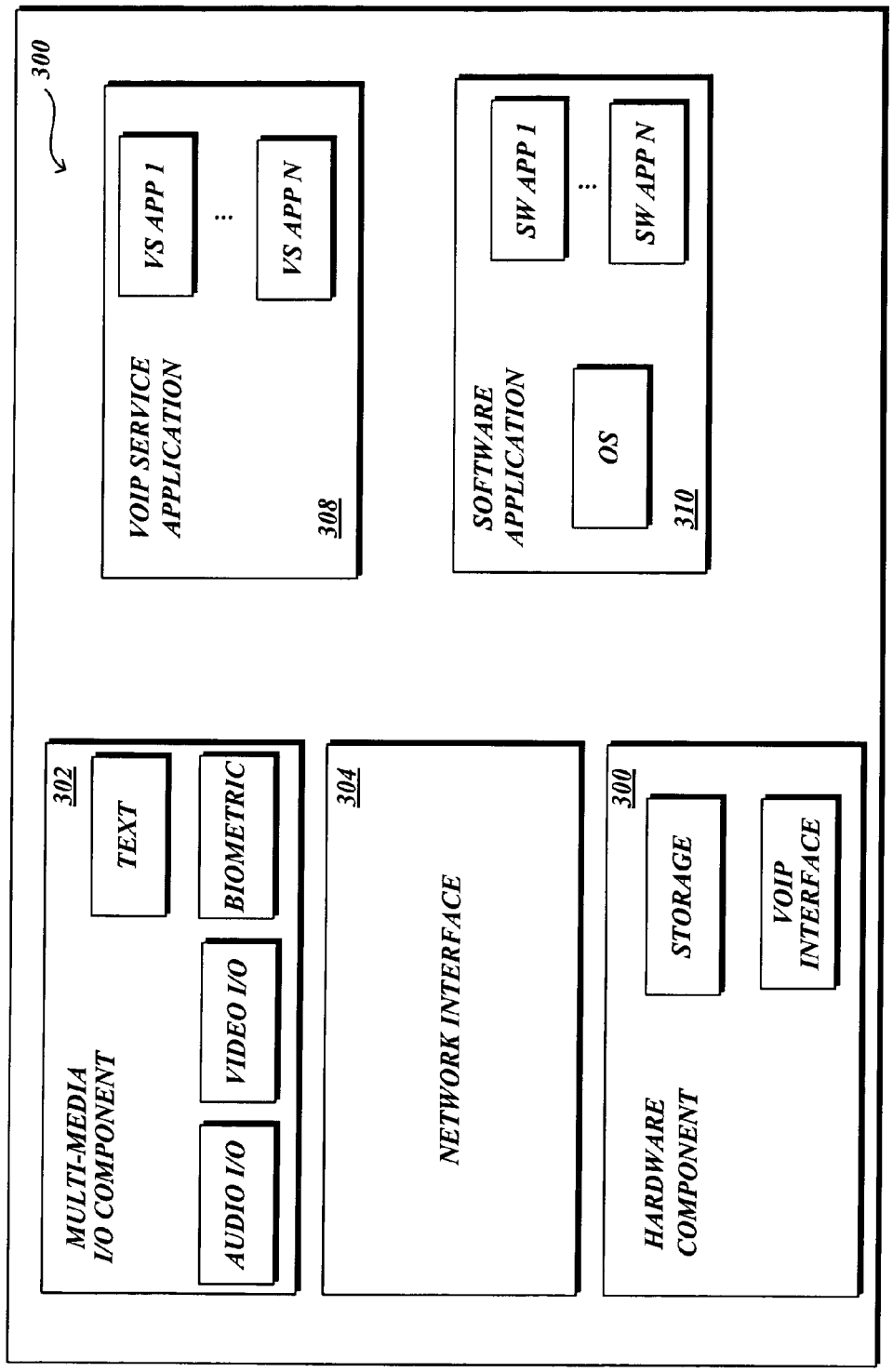
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles) associated with the VoIP client in which the device is included. In one embodiment, the hardware component 306 may include a VoIP interface card which allows a non-VoIP device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services.

Figure 4:
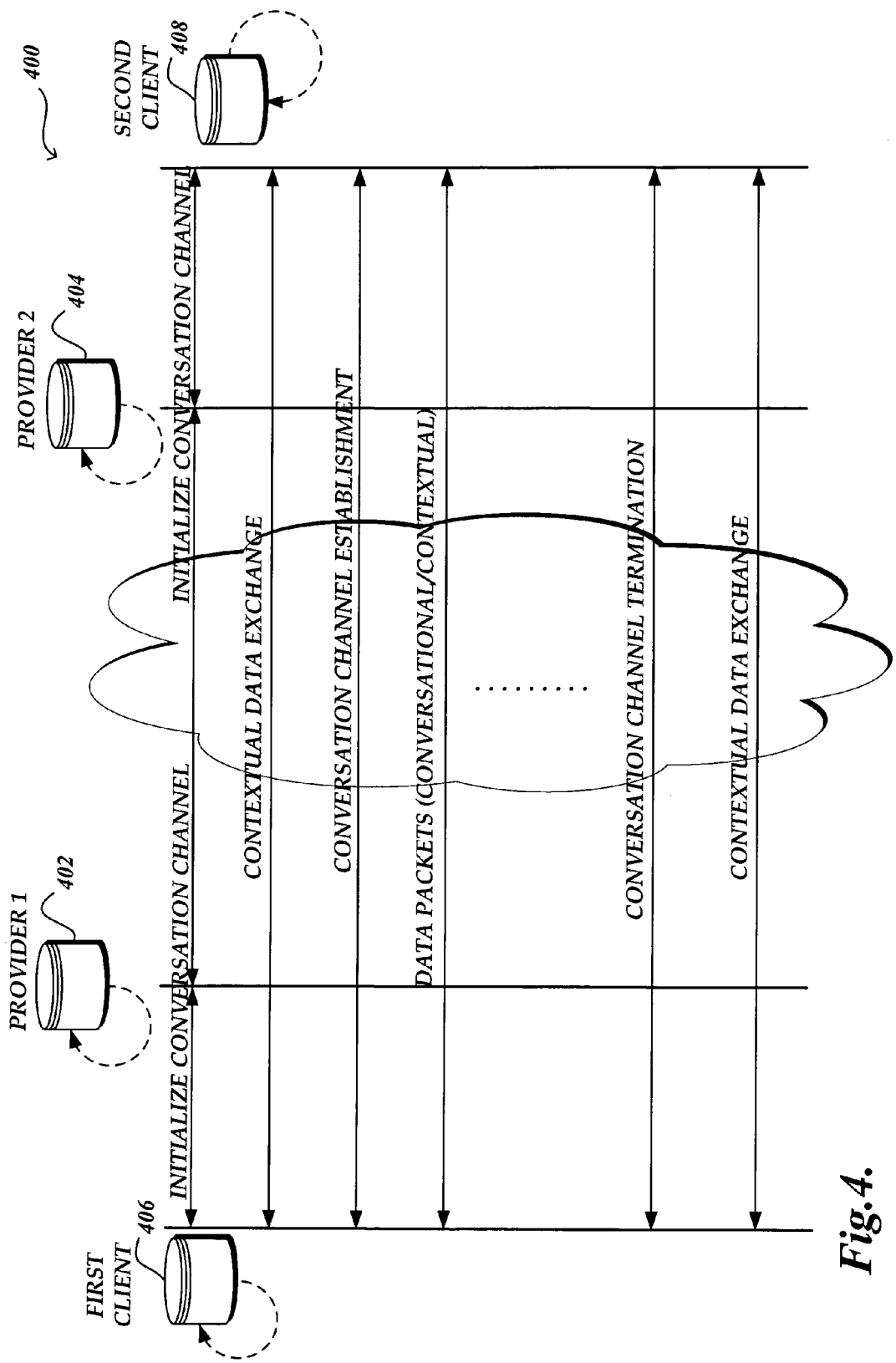
FIG. 4 is a block diagram illustrative of the exchange of data between two VoIP clients over a conversation channel in accordance with an aspect of the present invention.

With reference to FIG. 4, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which, the first VoIP client 406 and the second VoIP client 408, each includes only one VoIP device. Accordingly, the discussion provided herein will refer to connection of the two VoIP devices. The individual using the device of the first VoIP client 406 may select or enter the unique client identifier of the client that is to be called. Provider 1 402 receives the request from the device of the first VoIP client 408 and determines a terminating service provider (e.g., Provider 2 404 of the second VoIP client 408) based on the unique client identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by the VoIP service providers (e.g., Provider 1 402 and Provider 2 404), depending on the nature of the contextual information. In one embodiment, the VoIP service providers 402, 404 may add/delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail below, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 5:
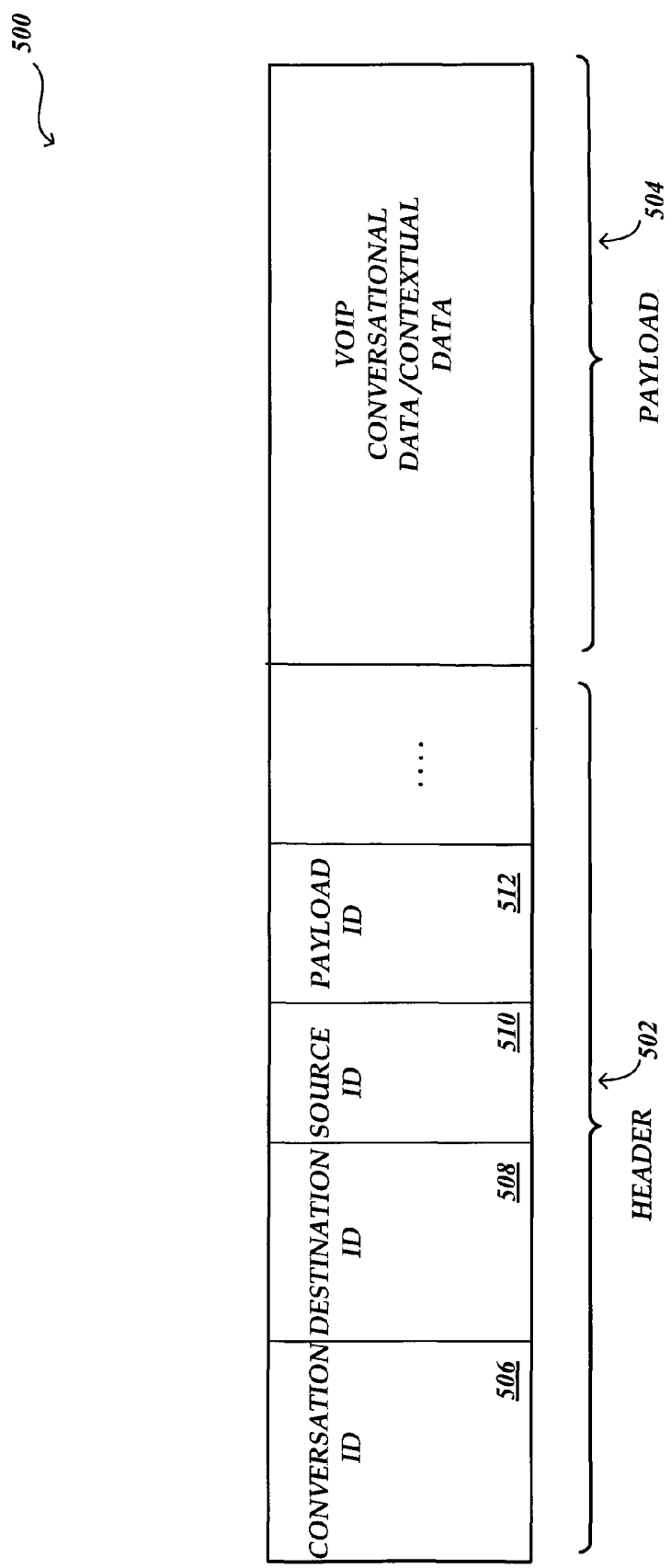
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique client identifier of the client being called, a Source ID 510 (unique client identifier of the calling client or device identifier), Payload ID 512 for identifying the type of payload (e.g., conversation or contextual), individual ID (not shown) for identifying the individual to which the conversation data is related, and the like. In an alternative embodiment, the header 502 may contain information regarding Internet protocol versions and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context) and the like. More specifically, the contextual information may include client preference, client rules, client's location (e.g., user location, device location, etc.), biometrics information, the user's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete the VoIP client's contextual data before forwarding the contextual information. For example, the VoIP client's confidential information will be deleted by the VoIP service provider associated with that client unless the client authorizes such information to be transmitted. In some cases, a minimal amount of contextual information is transmitted outside of an intranet network.

Figure 6:
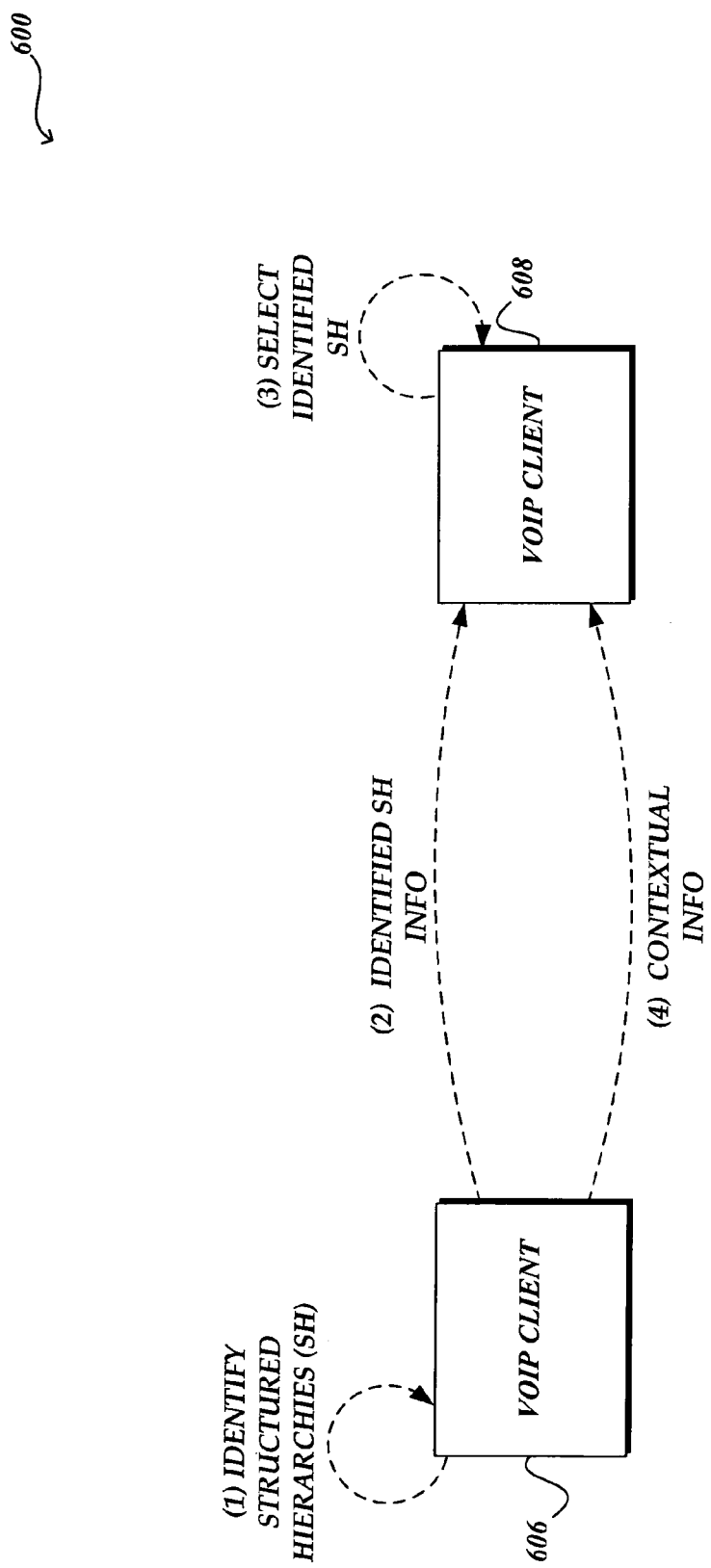
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIG. 4, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies is used to carry the contextual information, how to identify the structured hierarchy, and the like. Such information will be exchanged between VoIP Client 606 and VoIP Client 608 before the corresponding contextual information is exchanged. Upon receipt of the information identifying which structured hierarchy will be used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated, and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7A:
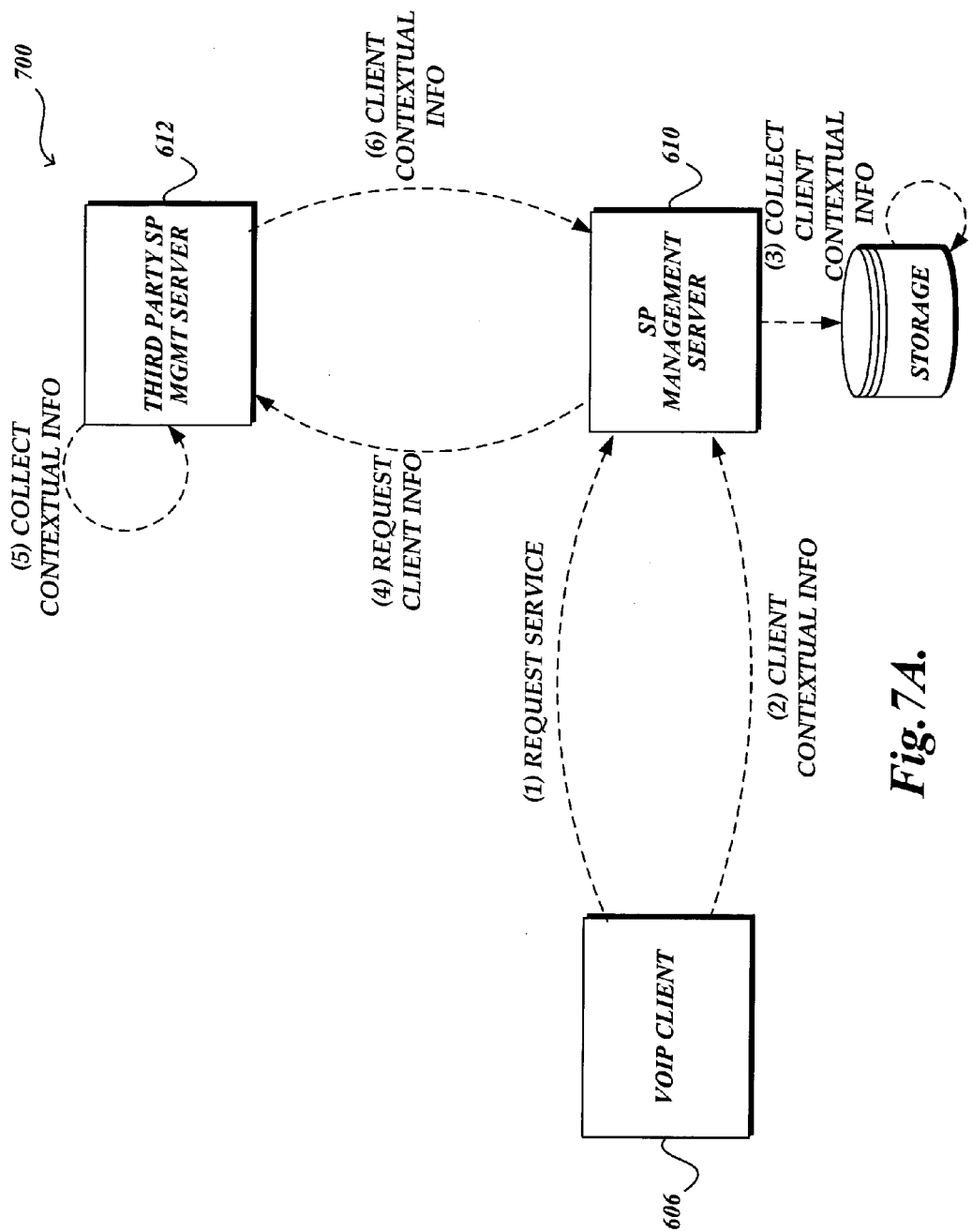
FIGS. 7A and 7B are block diagrams illustrating interactions between VoIP entities for collecting and providing contextual information in response to an inquiry for a service in accordance with an aspect of the present invention.
Figure 7B:
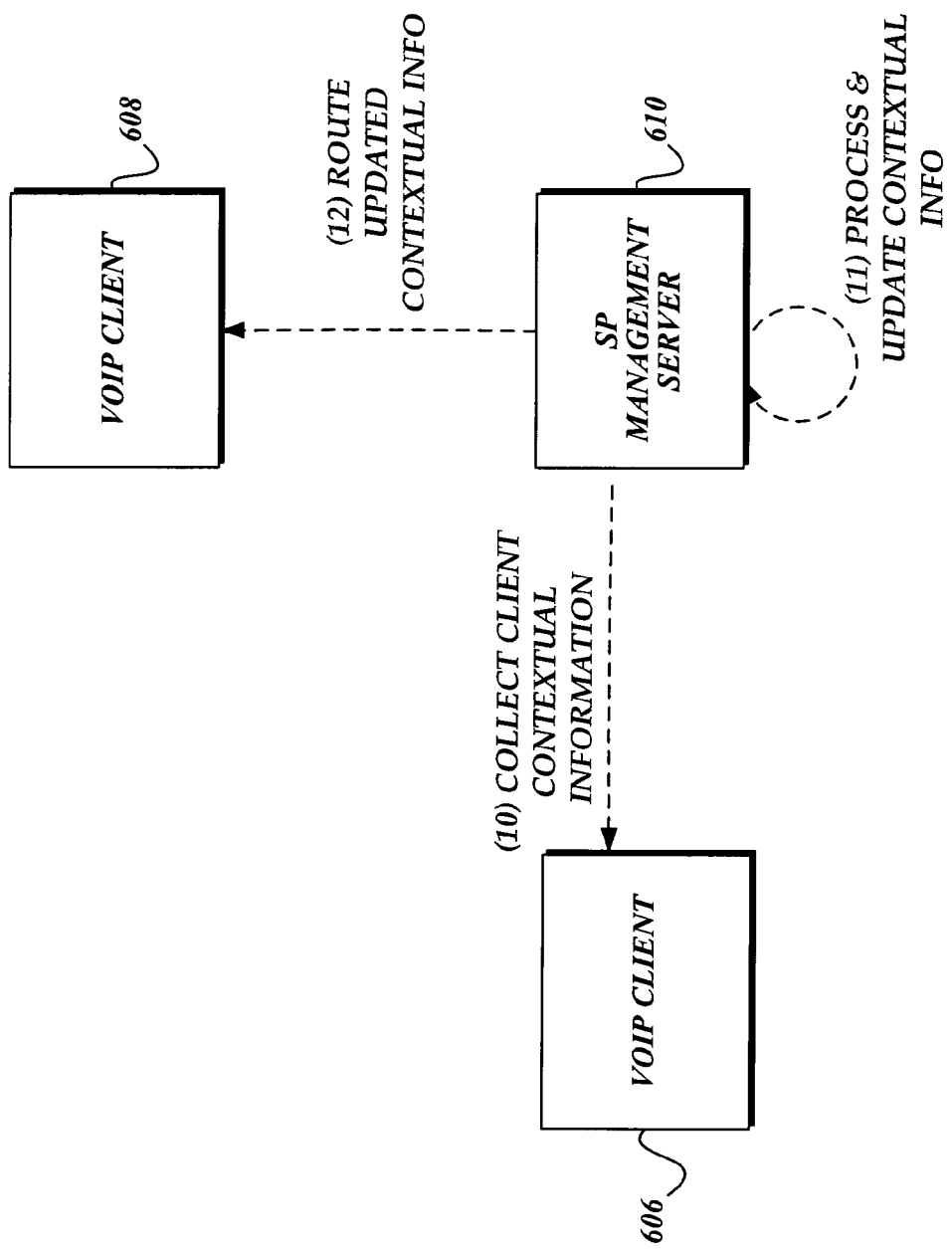

FIGS. 7A and 7B are block diagrams 700 illustrating the collection, and exchange of contextual information among VoIP entities in response to a request for a service or in the course of providing the requested service in accordance with an embodiment of the present invention. In one embodiment, the VoIP entities may include VoIP clients, VoIP service providers for the clients, third party service providers (e.g., location service provider), and the like.

With reference to FIG. 7A, in one embodiment, VoIP Client 606 may send a request for a desired service to Service Provider (SP) Management Server 610. SP Management Servers 610 may be a service provider on premises (e.g., part of a client if the client is a corporation), or a service provider off premises (e.g. an external service provider as illustrated in FIGS. 7 A-B). As will be described in greater detail below, SP Management Servers 610 may be any VoIP related service providers, including a call center, a customer support center, a VoIP service provider, an interactive E-commerce server, a centralized client information management server, and the like. Likewise, a desired service may be seeking services which can be provided by SP Management Servers 610. For example, a desired service may be a customer service regarding problems in a VoIP device or a VoIP call in a call center environment. A desired service may also be a VoIP call connection request, an E-commerce transaction, etc.

For discussion purposes, assume that VoIP Client 606 has a prearranged agreement with SP Management Server 610 (e.g., a customer support center) for obtaining customer care services for a VoIP device. Third Party SP Management Server 612 may relate to a manufacturer of components of the VoIP device, suitable for providing additional information relating to the VoIP device. In one embodiment, SP Management Server 610 may obtain contextual information from VoIP Client 606, which may have been prepackaged in connection with the service request. As will be described in greater detail below, it is contemplated that structured hierarchies are utilized to carry contextual information (contextual data packets) between several VoIP entities in this illustrative embodiment. The obtained contextual information may include all the information that SP Management Server 610 would need. SP Management Server 610 processes the request and the client's contextual information to identify what information will be further collected and which appropriate source will be contacted, or queried, to obtain the identified information.

If the appropriate source is a Third Party SP Management Server 612, SP Server 610 requests the identified information and obtains the information from Third Party SP Management Server 612. SP Server 610 and Third Party SP Management Server 612 may exchange more information including the client's contextual information relating to the VoIP Client 606 and/or the device. In an illustrative embodiment, upon receipt of the service request, SP Management Server 610 obtains and/or collects any readily available contextual information, for example previously obtained contextual information, related to VoIP Client 606 and/or the VoIP device from its database.

Referring to FIG. 7B, SP Management Server 610 obtains the identified information from VoIP Client 606 as part of contextual information if the appropriate source is VoIP Client 606. In one embodiment, SP Management Server 610 may send a request for obtaining the information. Upon receipt of the request, VoIP Client 606 collects the requested information and identifies structured hierarchies which will be used to carry contextual information including the requested information. The contextual information is transmitted from VoIP Client 606 to SP Management Server 610 utilizing the identified structured hierarchies. Alternatively, SP Management Server 610 may collect the identified information from VoIP Client 606 via a secured connection.

In one embodiment, SP Management Server 610 forward all or subsets of the received information to another service provider or Third Party SP Management Server 612. SP Management Server 610 may process the obtained client's contextual information and other additional information, and/or store desired parts of such information. The stored information may be used in future services for VoIP Client 610 or the like. As discussed above, SP Management Server 610 may further identify and obtain (or collect) additional contextual information relating to the requested service and update the current contextual information (e.g., previously obtained location information) accordingly. In an illustrative embodiment, information may be collected utilizing a Server-Pull method (client provides information upon server's request), a Server-Push method (server pushes information without client's request), or the like. For example, SP Management Server 610 may transmit provider contextual information (e.g., contextual information relating to SP Management Server 610 including information corresponding to a set of applications) to VoIP Client 606 without having any request for such information from the client. The provider contextual information may correspond to embedded instructions for invoking user interfaces on a VoIP device, for collecting information from a VoIP device, etc. In this manner, more contextual information can be collected.

Based on the newly collected information, SP Management Server 610 may identify additional provider contextual information for collecting more information if necessary. In one embodiment, SP Management Server 610 may identify additional user interfaces adaptive to the user interactions and/or other contextual information obtained from Third Party SP Management Server 612, and the like. SP Management Server 610 may transmit provider contextual information (relating to the additional user interfaces) to VoIP Client 606. Subsequently, the additional user interfaces may be provided on a VoIP device. SP Management Server 610 generates integrated contextual information by combing obtained contextual information, additional information, etc. before transmitting the contextual information. As mentioned above, SP Management Server 610 may identify part of the current contextual information to be removed before transmitting the contextual information and then update the received contextual information accordingly. SP Management Server 610 determines VoIP Client 608 as an appropriate party who can provide the desired service, or a receiving party for the call initiation request. SP Management Server 610 may route the service request and appropriate subsets of the contextual information to VoIP Client 608. Alternatively, SP Management Server 610 transmits the collected contextual information to another service provider which will eventually determine an appropriate party who can provide the desired service or a receiving party for the call initiation request. Another service provider may forward the received contextual information to an appropriate party or receiving party (e.g., VoIP Client 608). Another service provider may collect more contextual information, if necessary, and update the received contextual information by adding, deleting and/or modifying information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, XML namespace is provided to give the namespace a unique name. In some instances, the namespace may be used as a pointer to a centralized location containing default information about the namespace.

In accordance with an illustrative embodiment, while the communication channel is being established, VoIP Client 606 may identify a XML namespace for contextual information. For example, the XML namespace attribute may be placed in the start tag of a sending element. It is to be understood that XML namespaces, attributes, classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

Figure 8A:
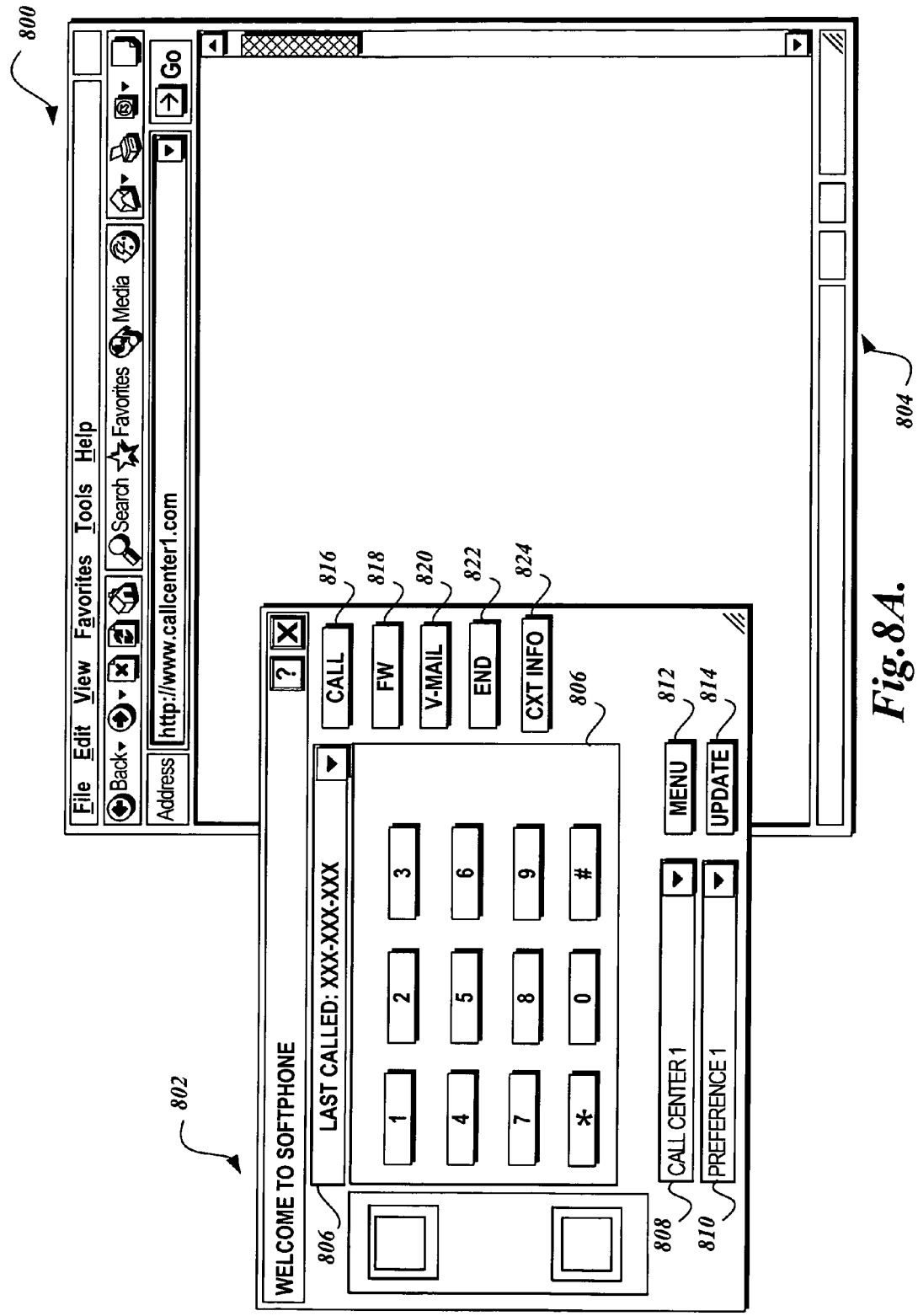
FIGS. 8A and 8B are block diagrams illustrating integrated user interfaces for providing a service in accordance with an aspect of the present invention.
Figure 8B:
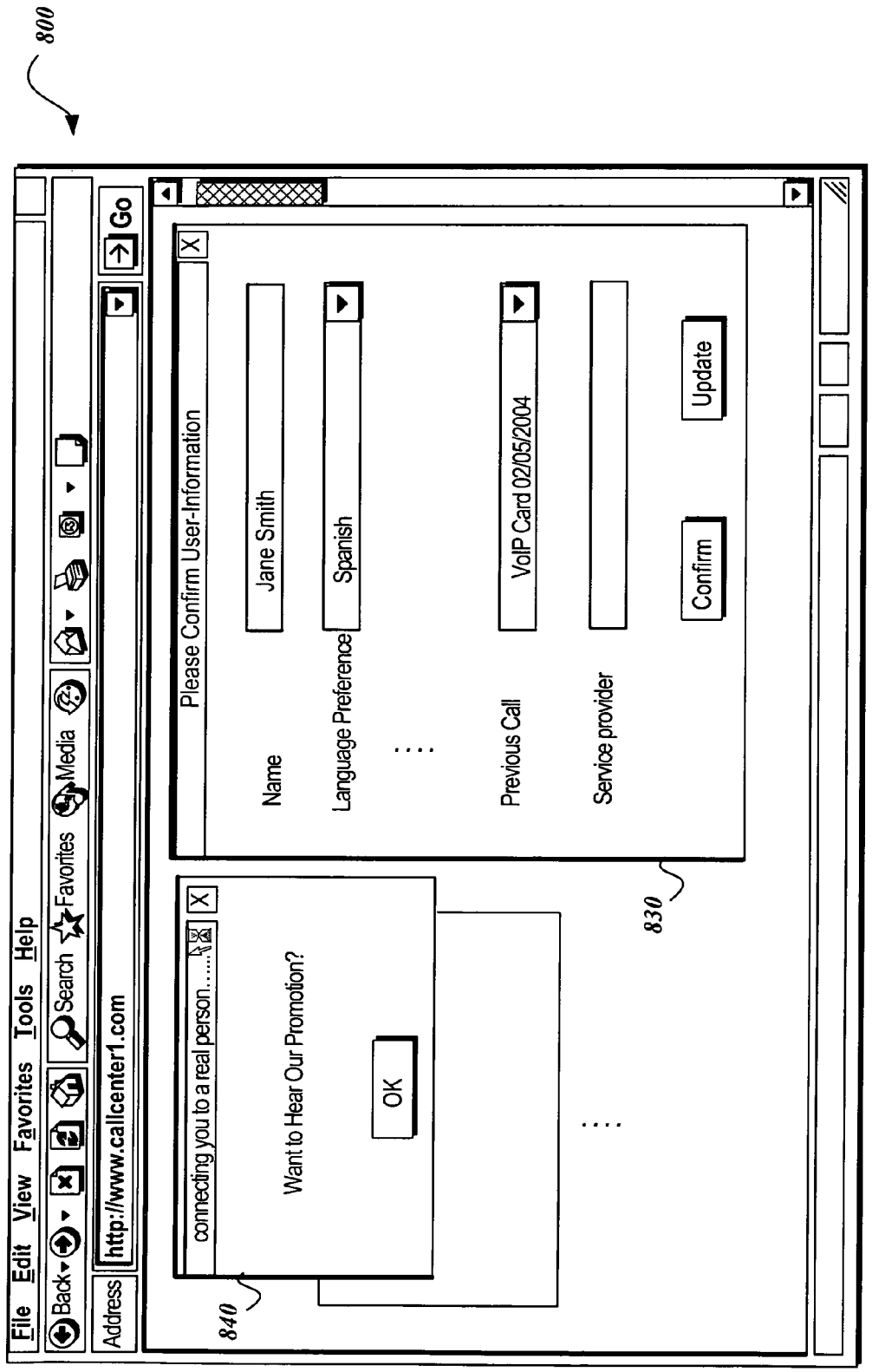
Figure 9:
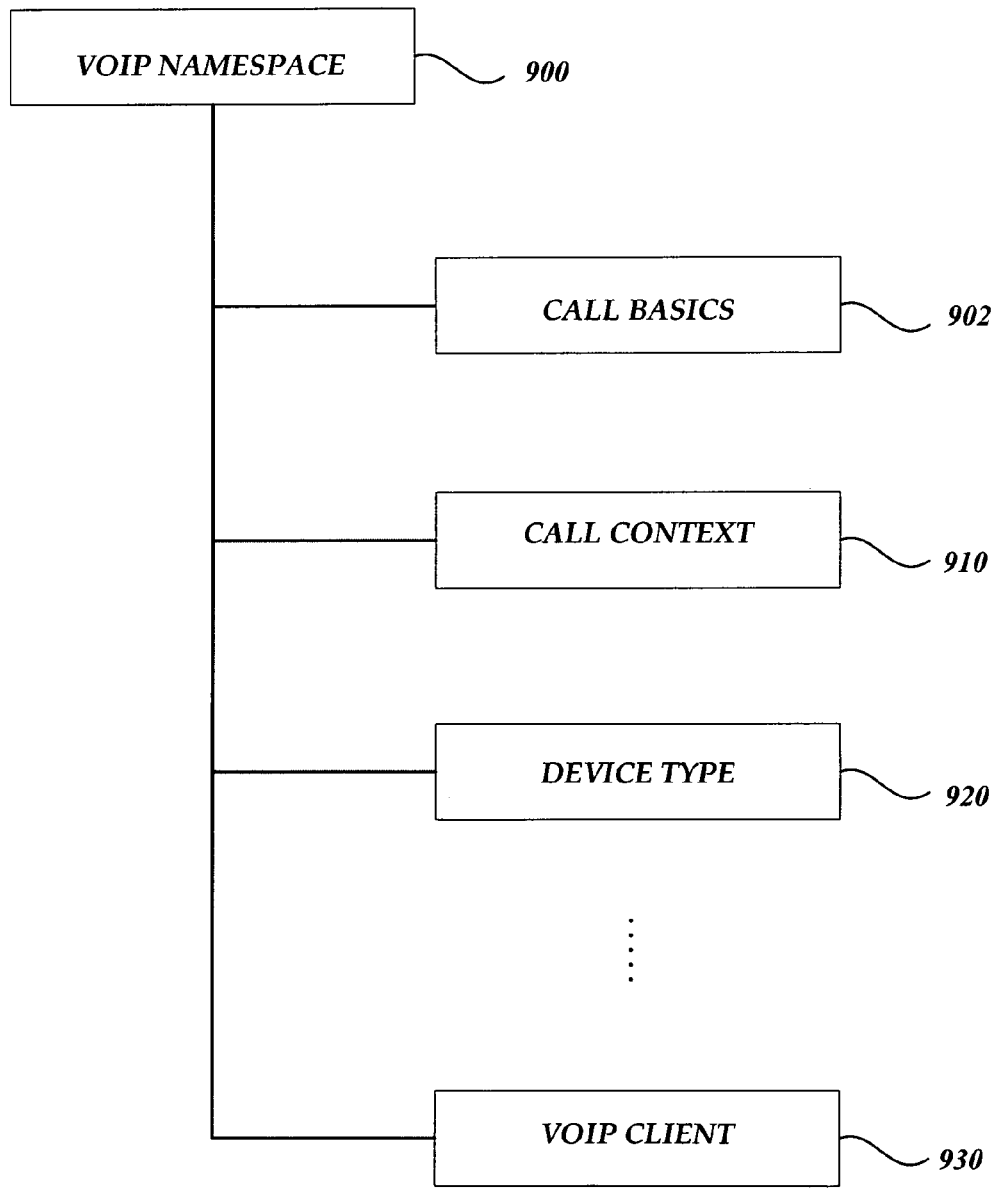
FIGS. 9-13 are block diagrams illustrative of various attributes and classes of structured hierarchies corresponding to VoIP contextual information in accordance with an aspect of the present invention.

FIGS. 8A and 8B are block diagrams illustrating user interfaces 800 in accordance with an exemplary embodiment of the present invention. For discussion purposes, assume that a client requested a call connection to a call center, for reporting problems in a device, utilizing a VoIP device (e.g., computer, etc.) suitable for exchanging VoIP conversations. With reference to FIG. 8A, a block diagram illustrates user interfaces 800 initially displayed on a screen of the VoIP device when a client makes a service request. In a particular embodiment, an individual user or a client may have launched an Internet Phone User Interface 802 in order to initiate a call to ask for a service. It is contemplated that appropriate software and application components relating to VoIP conversations are readily resident on the VoIP device.

In an illustrative embodiment, the Internet Phone User Interface 802 may include various buttons and sub-screens to assist a user in making a VoIP call connection. For example, the Internet Phone User Interface 802 may include a keypad 804 similar to a keypad of a conventional telephony device. The Internet Phone User Interface 802 may include several selection menus 806, 808, 810 allowing the user to select last call number, a number from an address book (e.g., CALL CENTER 1), desired user preferences, and the like. MENU 812 and UPDATE 814 buttons may be utilized to change and/or view the selection menus 806, 808, 810. In one embodiment, other functional buttons 816, 818, 820, 824 may provide shortcuts for frequently used VoIP call features. For example, when CXT INFO 824 button is selected, a set of contextual information (prepackaged contextual information, information collected by the VoIP device, etc.) may be transmitted without receiving any requests for such contextual information. Additionally, in an illustrative embodiment, a main user interface 804 relating to the service provider may be provided, which may be a known Web page of the service provider, a previously obtained user interface (relating to past services), applications pushed by the service provider upon receipt of the request, or the like. In this embodiment, during a connection set-up phase, the service provider may receive a request for a service (e.g., a call connection request to the 800 number of a particular call center) from a client and subsequently received the client's contextual information. Based on the request and the client's contextual information, the service provider may determine whether additional information needs to be obtained from the client.

Referring to FIG. 8B, during the connection set-up phase, additional user interfaces 830, 840 may be provided for receiving or collecting desired user interactions. The service provider's contextual information relating to the additional user interface may be transmitted by the service provider. Alternatively, a device of the client may have previously obtained applications relating to the user interfaces suitable for providing desired user interactions. In this manner, appropriate user information (client's contextual information) collected before the call connection request, in conjunction with the relevant user information, is routed to a receiving party (e.g., an operator, an agent, a primary contact, an interactive voice response system (IVRS), a call distributing system, a third-party service provider, and the like). For example, an agent at a call center can receive appropriate information relating to the requested services such as client information, previous history of services, possible solutions, next level of support and the like. It is contemplated that exchange of contextual information can be done at any time during a conversation. In one embodiment, in order to improve network bandwidth, a prolonged period of silence (no exchange of voice data packets for a threshold time) may be detected and utilized for exchange of contextual information.

With reference to FIGS. 9-13, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 900. In one embodiment, the VoIP namespace 900 is represented as a hierarchically structured tree of nodes, each node corresponding to a subclass which corresponds to a subset of VoIP contextual information. For example, a VoIP Namespace 900 may be defined as a hierarchically structured tree comprising a Call Basics Class 902, a Call Contexts Class 910, a Device Type Class 920, a VoIP Client Class 930, and the like.

Figure 10:
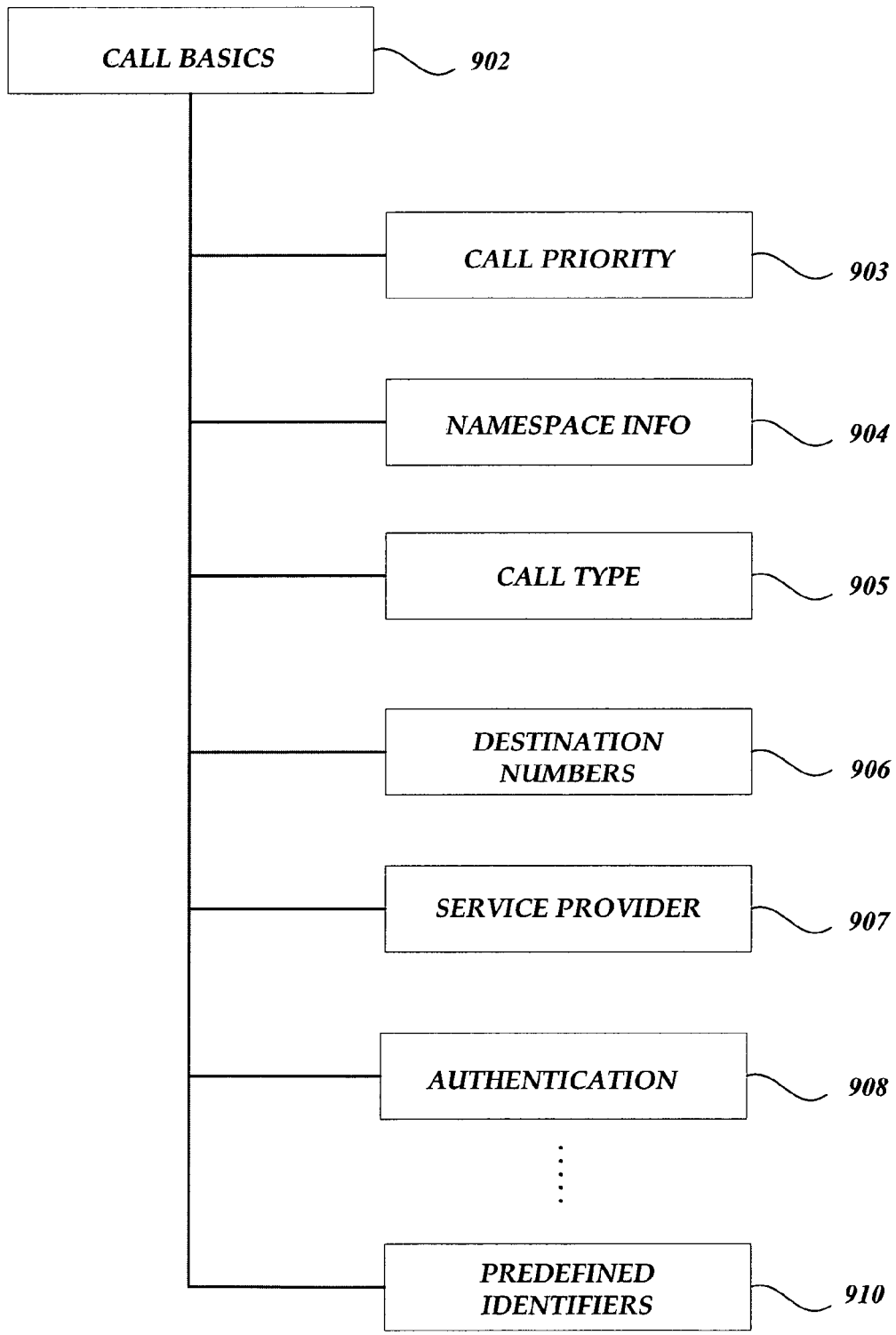

With reference to FIG. 10, a block diagram of a Call Basics Class 902 is shown. In an illustrative embodiment, Call Basics Class 902 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah," "oops," "wow," etc.) and facial expressions in graphical symbols. In one embodiment, a Call Basics Class 902 may be defined as a sub-tree structure of a VoIP Namespace 900, which includes nodes such as call priority 903, namespace information 904, call type 905, destination numbers 906, service provider 907, authentication 908, predefined identifiers 909, and the like.

Figure 11A:
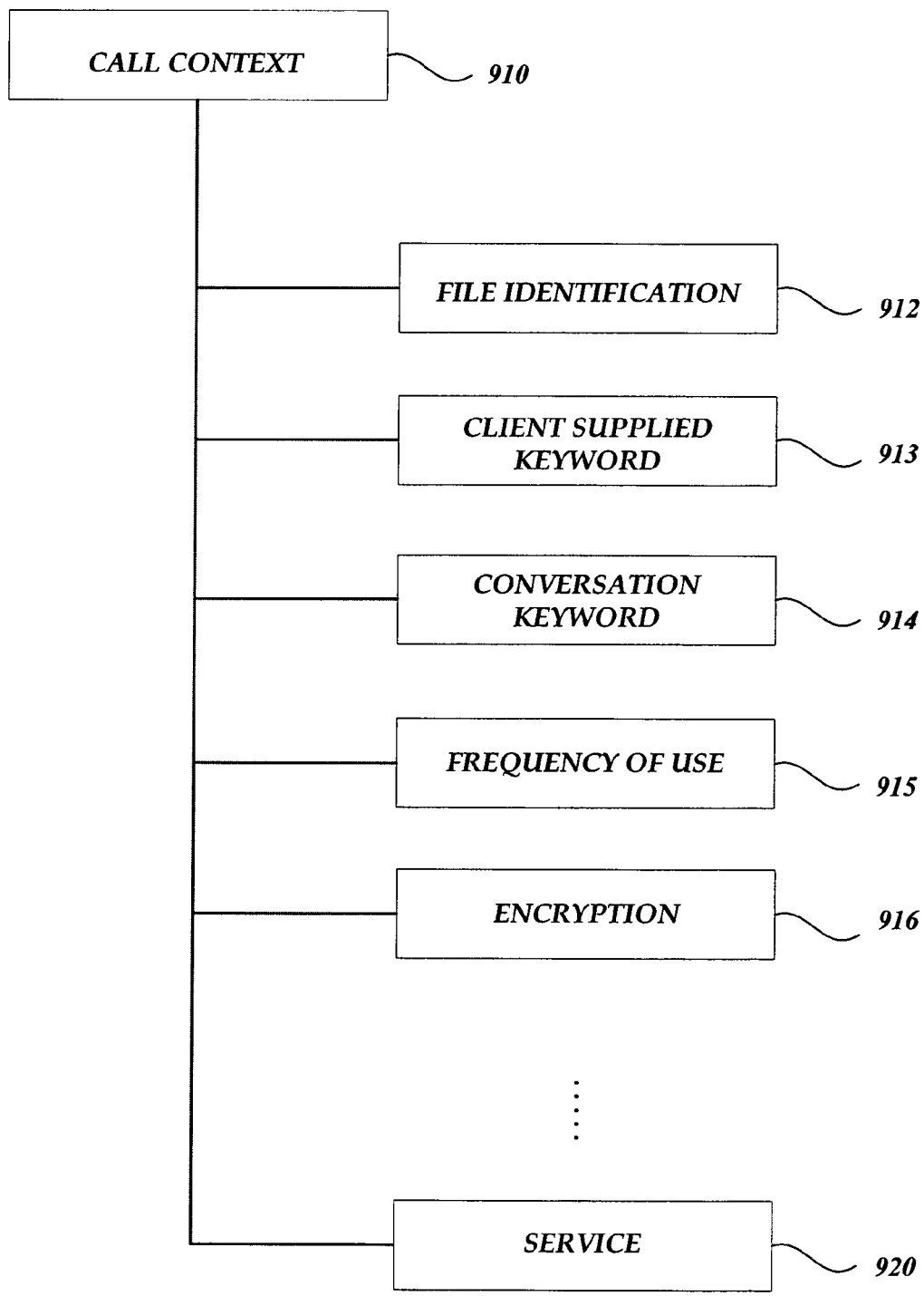
Figure 11B:
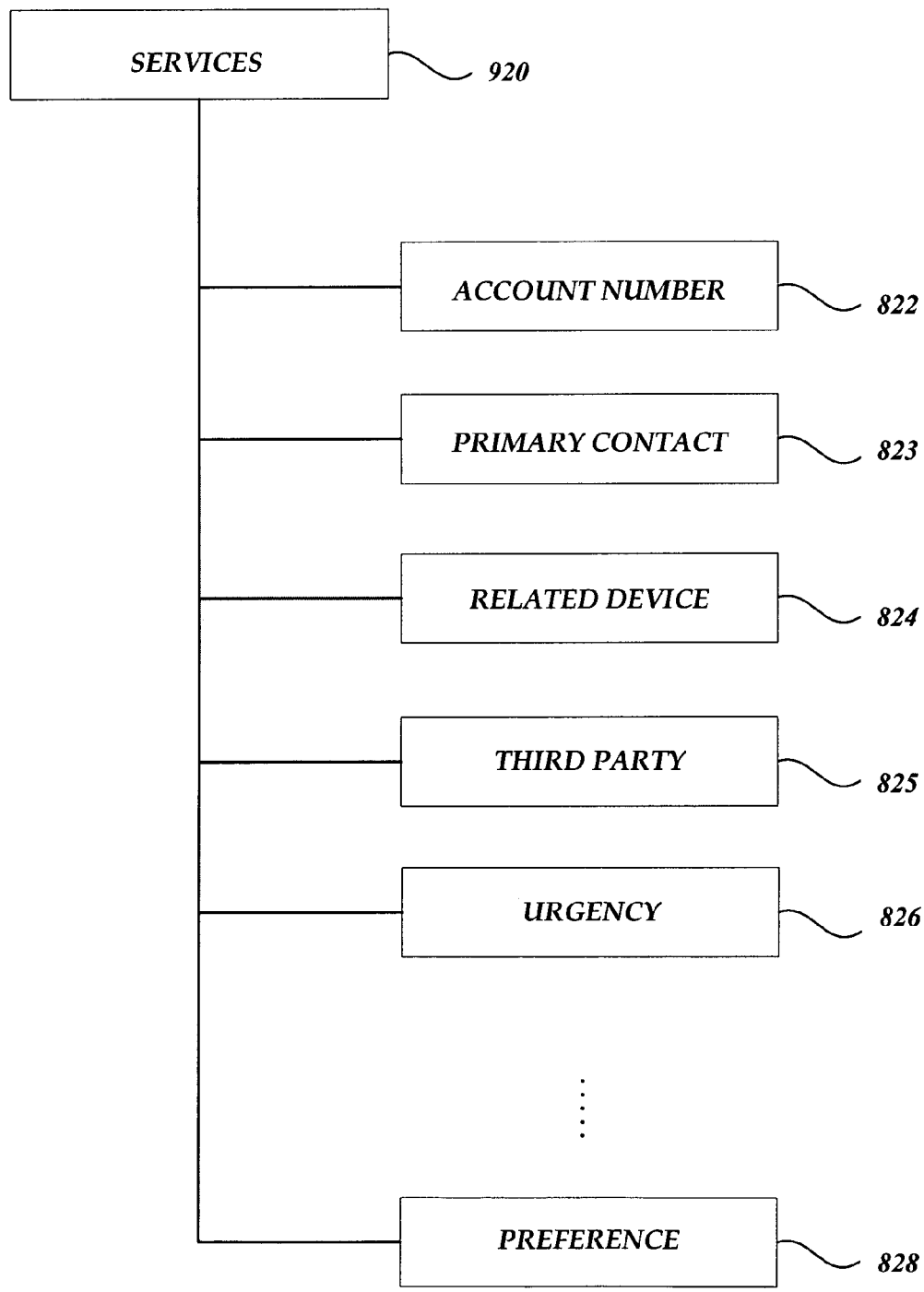

With reference to FIGS. 11A and 11B, block diagrams of a Call Contexts Class 910 and one subclass of the Call Contexts Class 910 are shown. In one embodiment, a subset of VoIP contextual information relating to conversation context may correspond to the Call Contexts Class 910. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation). Additionally, the contextual information relating to conversation context may include information relating to encryption (whether and/or how to encrypt contextual information) and subject of service (a type or nature of the service when a client requests such service from a service provider), among many others. In accordance with an illustrative embodiment, a Call Contexts Class 910 may be defined as a sub-tree structure of a VoIP Namespace 900, which includes nodes corresponding to file identification 912, client supplied keyword 913, conversation keyword 914, frequency of use 915, encryption 916, service 918, and the like.

Referring to FIG. 11B, a block diagram of a Requested Service 920 subclass is shown. In one embodiment, the Requested Service 920 subclass may correspond to a subset of information relating to a requested service. The contextual information relating to a requested service may include a client account number associated with the requested service. The client account number may be used as a key to search the database associated with the service provider. The database may be maintained by a third party server. In one embodiment, in a call center environment, a primary contact may be assigned to each client. For example, general clients may have a help desk operator as a default primary contact while an important client (e.g., vendors, high volume clients, etc.) may have a dedicated primary contact. Alternatively, an IVRS may be assigned as a default primary contact. Likewise, the last primary contact that has previously provided good service may be recorded as a primary contact.

The contextual information relating to a requested service may further include information relating to a device which requires the service (this may be the same as, or different from, a device currently used by the client in a communication channel). Third party SPs may be associated with a manufacturer of the device, or manufacturer of components of the device. Such third party SPs may have additional information crucial to providing the requested services. Further, the contextual information relating to a requested service may include a level of urgency which may be utilized, in conjunction with other information, to determine a priority of the requested service. The client may specify preferences or rules related to the requested services. For example, the client may specify a language preference, a time threshold that the client is willing to wait for the service, and the like. In accordance with an illustrative embodiment, a Requested Service Subclass 920 may be defined as a sub-tree structure of a Call Contexts Class 910, which includes nodes corresponding to account number 922, primary contact 923, related devices 924, third party 925, urgency 926, preference 928, and the like.

Figure 12:
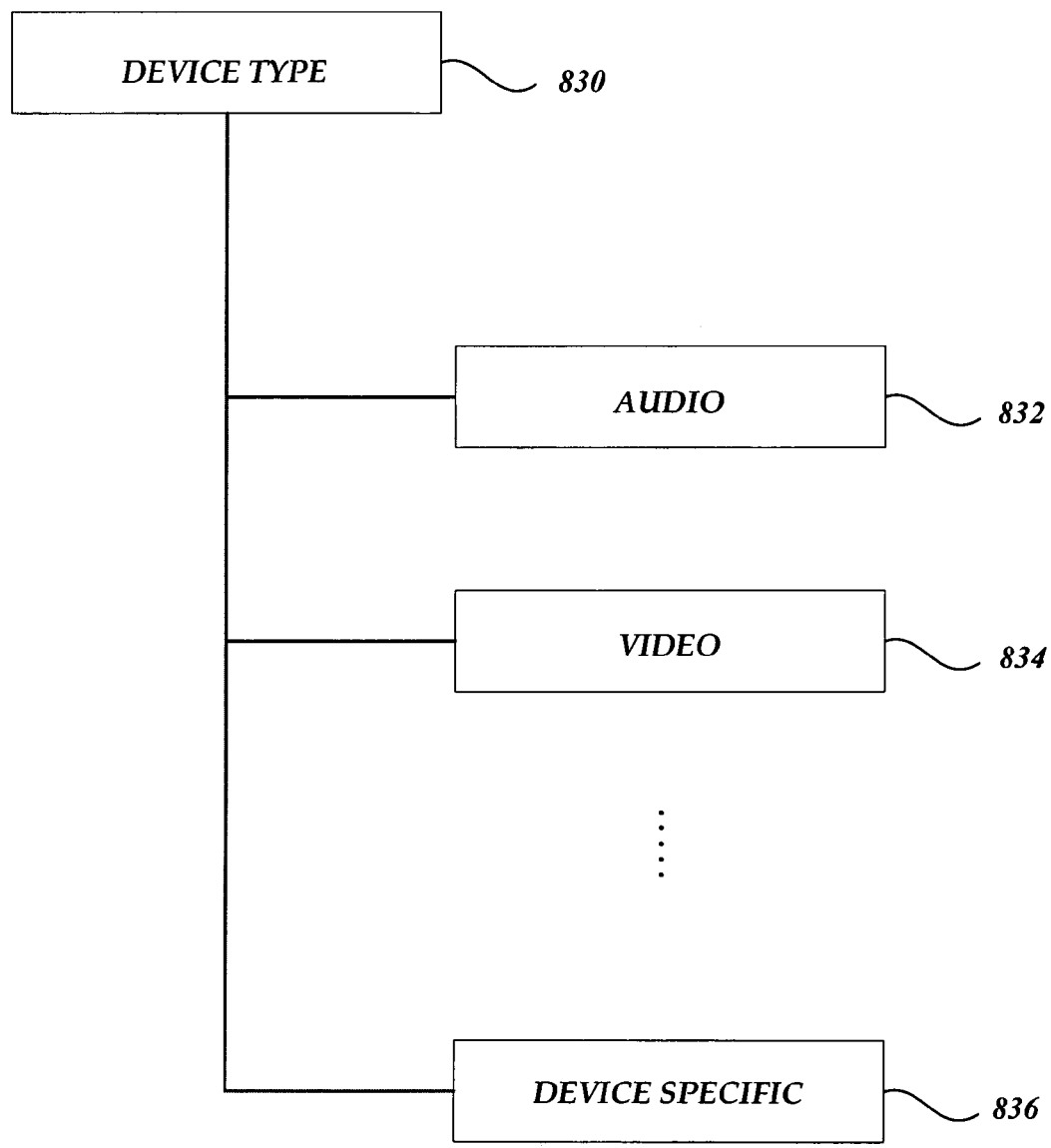

With reference to FIG. 12, a block diagram of a Device Type Class 930 is depicted. In one embodiment, a Device Type Class 930 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as type of the computer system, processor information, network bandwidth, wireless/wired connection, portability of the computer system, processing settings of the computer system, and the like. In an illustrative embodiment, a Device Type Class 930 may be defined as a sub-tree structure of a VoIP Namespace 900, which includes nodes corresponding to Audio 932, Video 934, Device Specific 936 and the like.

Figure 13:
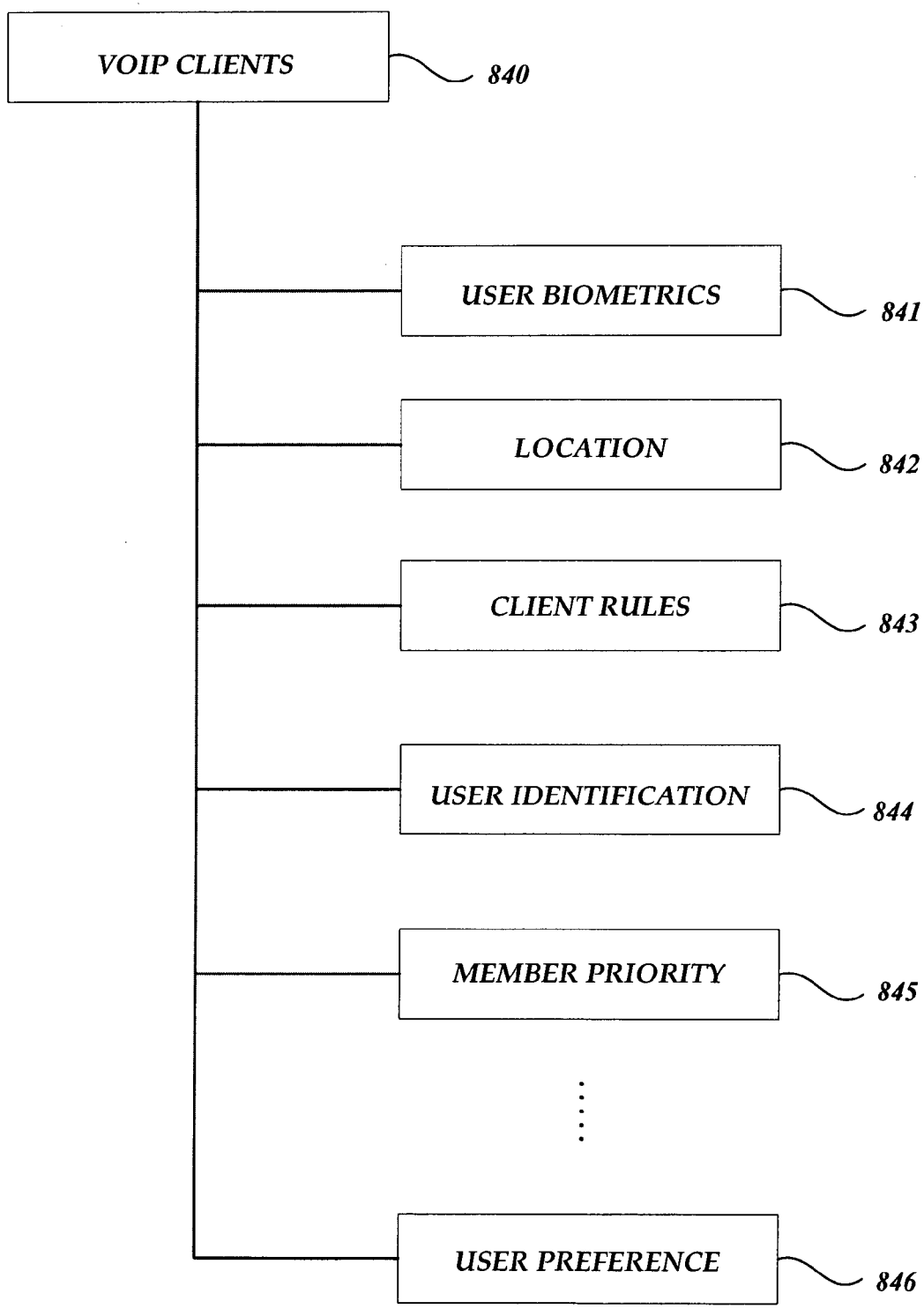

FIG. 13 depicts a block diagram of a VoIP Client Class 940. In accordance with an illustrative embodiment, a VoIP Client Class 940 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. The subset of the VoIP contextual information relating to the VoIP client may include assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. As will be described in greater detail below, the subset of the VoIP contextual information relating to the VoIP client may include location information. In one embodiment, a VoIP Client Class 940 may be defined as a sub-tree structure of a VoIP Namespace 900, which includes nodes corresponding to user biometrics 941, user preference 942, client rules 943, user identification 944, member priority 945, location 946, and the like.

Figure 14:
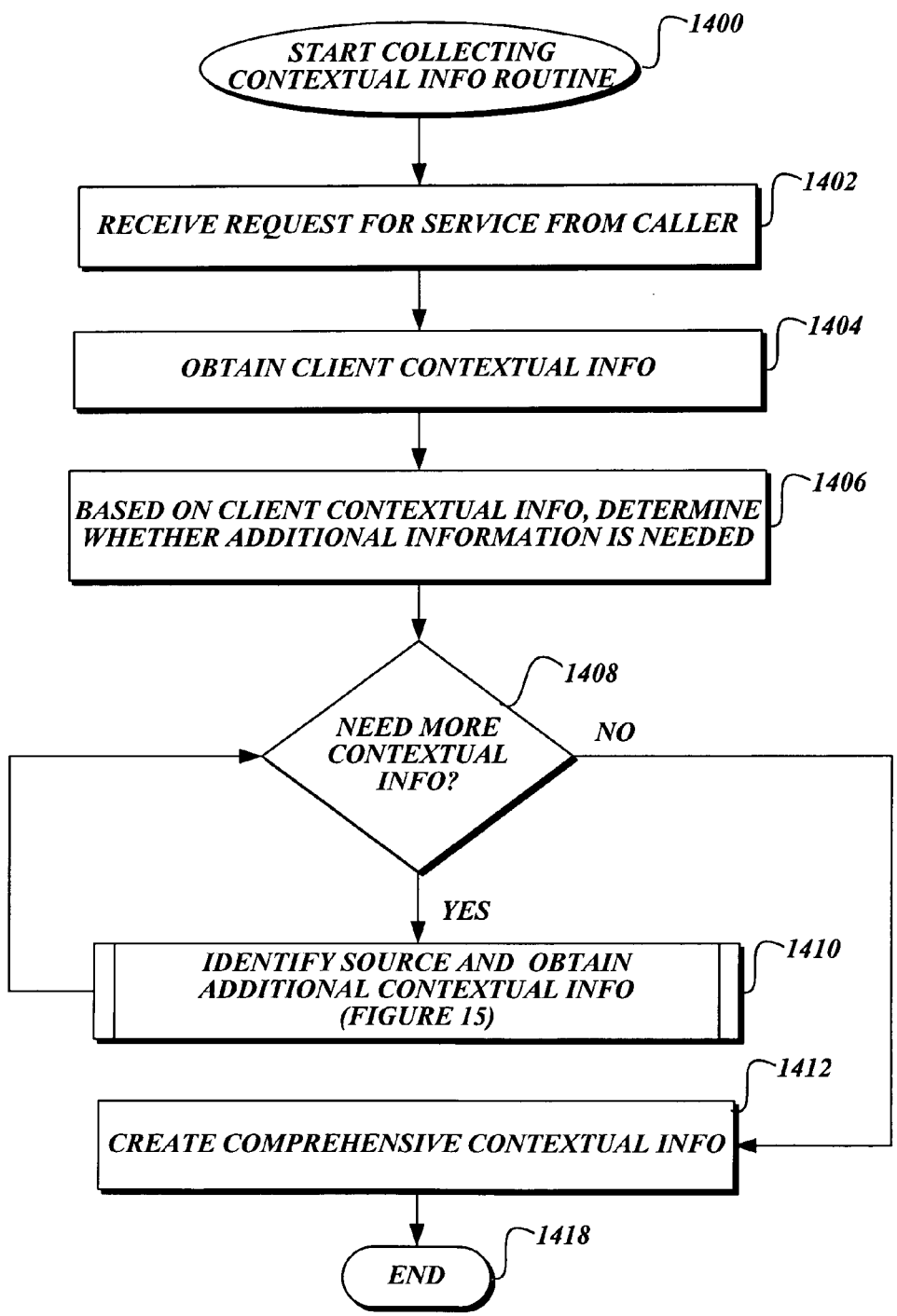
FIG. 14 is a flow diagram illustrating a contextual information collecting routine in accordance with an aspect of the present invention.

FIG. 14 is a flowchart illustrating a routine 1400 for collecting contextual information and/or obtaining contextual information in response to a service request or in the course of providing a service in accordance with an embodiment of the present invention. For the purpose of discussion, assume that a device of a caller (a calling VoIP client) may be associated with a service provider for receiving a particular service. In addition, appropriate software and application components relating to VoIP conversations are readily resident on the device. The caller transmits a service request to the service provider by transmitting a request to initiate a VoIP call communication with one of the contacts (e.g., an operator, an agent, an IVRS, etc.) representing the service provider.

Although the illustrative embodiment is described in connection with the routine 1400 and focused on collecting contextual information during a connection set-up phase, it is contemplated that a service request can be exchanged at any time, including before establishing a communication channel (e.g., during a connection set-up phase), during a conversation, or after terminating a communication channel. Further, upon receipt of a service request, other contextual information, relating to providing such service, may be collected by various VoIP entities including a service provider, a device, a third party service provider, etc., and exchanged. It is also contemplated that any suitable VoIP entities other than the service provider can be responsive to the service request and provide the requested service. In one embodiment, the requested service may be provided in such a way that the client would not know the service is provided from VoIP entities other than the service provider.

Beginning at block 1402, the service provider receives a service request from the caller. At block 1404, the service provider obtains contextual information relating to the caller and the request. As described above, based on the content of the contextual information, at least one structured hierarchy may be identified from predefined structured hierarchies, such as XML namespace and the like. The service provider may also obtain the identified structured hierarchies from the caller. At block 1406, the service provider determines additional contextual information relating to the caller and/or the request for providing services. For example, an outstanding service request may require warrantee information for the device to gain an access to a third party service provider. In one embodiment, the requested service may not be determined until the service provider obtains enough information from various sources. In another embodiment, the service provider may identify services for the caller based on the caller's contextual information. Each identified service may need additional information from various sources. At decision block 1408, a determination is made as to whether additional information needs to be collected. If the additional contextual information is necessary, at block 1410, the service provider may utilize a source-identifying subroutine (see FIG. 15) for identifying a source and obtaining the information from the identified source. The routine 1400 continues the above-mentioned steps until there is no need to obtain additional contextual information. If the additional contextual information is no longer needed, comprehensive contextual information, adaptive to collected and/or obtained information, may be generated at block 1412. In an illustrative embodiment, the generated contextual information may be adaptive to the destination party to which the request and relevant contextual information will be routed. The destination party may be suitable for providing the desired service, or may forward the request along with the contextual information.

Further, the method of collecting contextual information may also be evolving based on the obtained contextual information. For example, a user's good mood may become bad when an IVRS starts communicating to obtain the additional contextual information. The user's mood can be detected by recognizing cursing words, body heat, tone of voice, stress, and the like. Upon receipt of contextual information relating to the mood change, the service provider may ask whether the user prefers a human operator or a form (GUI) rather than an IVRS. The service provider may collect contextual information in accordance with the user selection. Alternatively, the service provider may provide a promotion (e.g., coupons, rewards, etc.) to boost the user's mood, or an explanation of the current situation such as a long downtime in waiting for a human operator and the like. The routine 1400 completes at block 1418.

It is to be understood that the embodiments explained in conjunction with the routine 1400 are provided merely for example purposes. It is contemplated that the routine 1400 can also be performed by a VoIP device or a third party service provider. For example, a VoIP device can collect contextual information relating to a service and request additional information from a service provider or a third party service provider. Subsets of the collected contextual information and the additional information will be transmitted to a service provider from a VoIP device. In one embodiment, a VoIP device may send an automatic service request upon detection of problems without any human interactions. It is further contemplated that a service provider can forward a service request to a third party service provider for collecting contextual information and providing the requested service.

Figure 15:
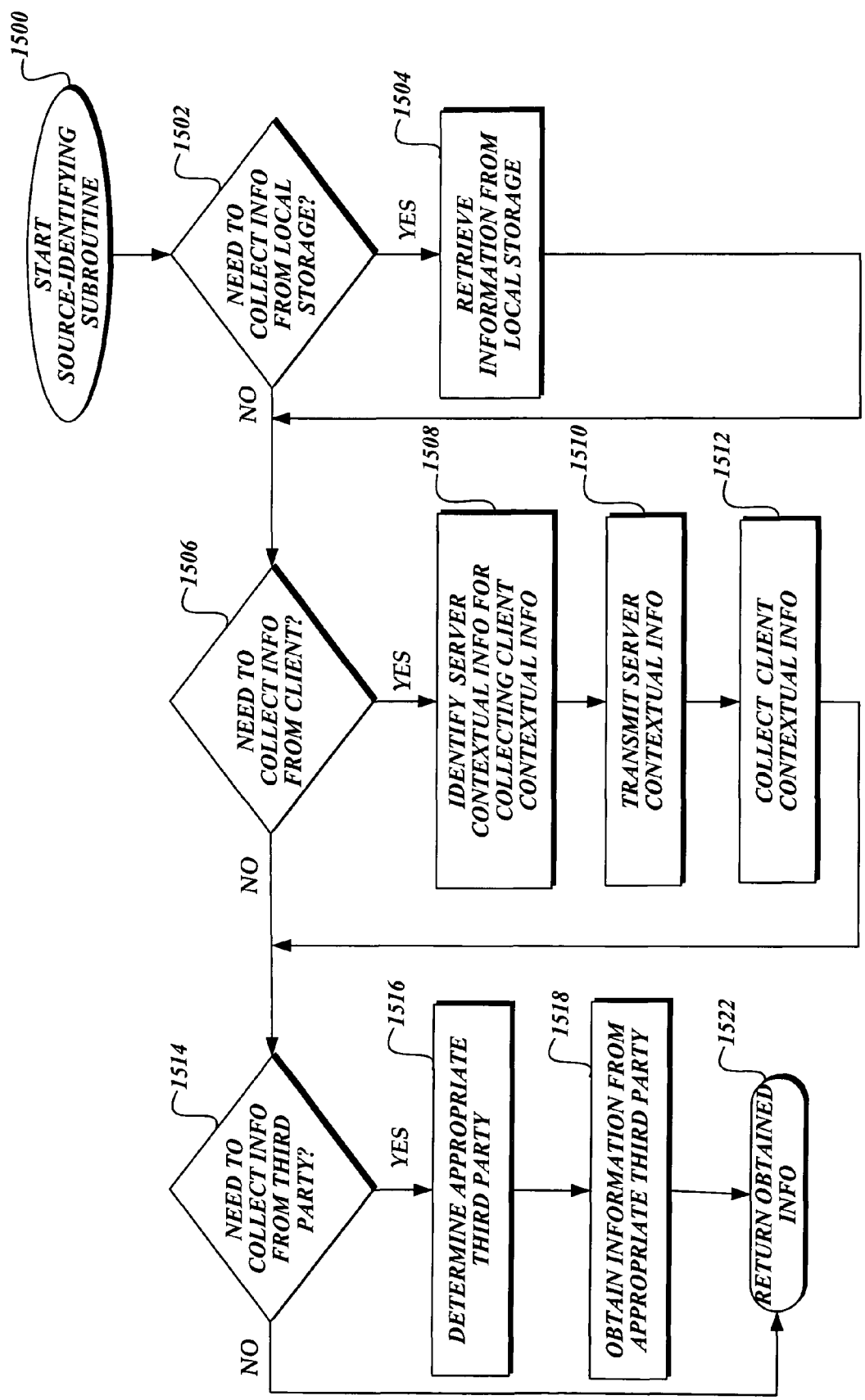
FIG. 15 is a flow diagram illustrating a source identifying subroutine utilized by the contextual information collecting routine in FIG. 14.

FIG. 15 illustrates a block diagram of a source-identifying subroutine 1500 in accordance with an embodiment of the present invention. As described in FIG. 14, the service provider will identify an appropriate source for collecting additional contextual information from the appropriate source. Any VoIP entities such as the caller, a third party service server, other service provider, and the like can be an appropriate source for the contextual information. The service provider may contact the appropriate source and collect the additional contextual information. In one embodiment, the service provider may send service provider's contextual information for collecting the information at the source side. In one embodiment, the service provider may send an inquiry for obtaining the additional contextual information to the appropriate source (e.g., third party service provider). When there are multiple sources available for the additional information, the service provider may collect and/or obtain the additional information from each of the multiple sources. Alternatively, the most appropriate source may be determined and contacted. The service provider may have predefined provider rules or logic to determine an appropriate source for particular information. For example, a GPS server may be one of the appropriate sources for geographic location information of a device equipped with GPS modules. If an individual user's mobile phone can provide the geographic location information of a mobile device, the device may be one of the appropriate sources. Similarly, if a VoIP client maintains geographic location information of devices in local storage, the VoIP client may be one of the appropriate sources. In this example, the service provider may select the most appropriate source based on the contextual information obtained from the caller and the callee. The contextual information may include callee's rules, caller's rules, callee's device information, a target individual user associated with the callee, and the like.

At decision block 1502, a determination is made as to whether any additional information can be obtained from the service provider itself, for example, from local storage. If it is determined at decision block 1502 that the additional information is locally available, at block 1504, the additional information is retrieved. If it is determined at decision block 1518 that the additional information is not locally available, the routine 1500 continues to decision block 1506 where a determination is made as to whether the additional contextual information can be obtained from the caller (client). If it is determined that the additional contextual information can be available from the caller, at block 1506, the service provider may identify its contextual information which will be used to collect the additional information at the caller's device. For example, a set of applications for providing or invoking user interfaces may be identified based on the requested service. Service provider's contextual information relating to the set of applications is transmitted to the caller at block 1508. As mentioned above, when the caller already has a set of applications suitable for collecting the additional information, embedded instructions to invoke user interfaces may be transmitted to the caller. Similarly, when the caller does not have appropriate applications suitable for collecting the additional information, a set of applications for providing user interfaces may be transmitted to the caller. At block 1510, the service provider collects the additional information from the caller. In an alternative embodiment, the caller may not allow the service provider to pull information from any devices of the caller. In this example, the service provider may request the caller to collect the additional information by identifying the set of applications on the caller's device. The caller's device, in return, collects and transmits the additional information detected while implementing the set of applications.

If it is determined that the additional information is not needed from the client (decision block 1506), or after the service provider has collected the additional contextual information (block 1510), at decision block 1514, it is determined whether any additional information needs to be obtained from at least one of third party providers. If it is determined at decision block 1514 that the additional information needs to be obtained from the third party SPs, the most appropriate third party SP for obtaining the additional information will be determined at block 1516. In one embodiment, the service provider may have predefined provider rules or logic to determine an appropriate source for particular information. Further, the caller may have provided caller's rules or preferences with respect to determining an appropriate source for particular information. The additional information is obtained from the most appropriate third party SP at block 1518. In an alternative embodiment, the service provider may obtain the additional information from various third party SPs and generate comprehensive information based on the obtained information. If it is determined at decision block 1514 that the additional information does not need to be collected from any third party SPs, or after the service provider obtained the additional contextual information at block 1518, the routine 1500 returns the obtained contextual information and completes at block 1522.

As mentioned above, it is contemplated that the service provider and the caller will continue exchanging contextual information and/or voice information for the requested service. During this exchange, the service provider may identify another service necessary or useful to the caller. In order to provide the identified service, the service provider may further collect contextual information from various sources. This may be useful when the caller does not know about the exact nature of available services, automatic service calls transmitted from a suitable VoIP device, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for collecting contextual information relating to a service provided over a digital communication channel, comprising:
  receiving, from a user of a packet-switched network, a request for a desired service;
  obtaining from the user of the packet-switched network contextual data packets having a predetermined arrangement for providing a set of user contextual information relating to the request for the desired service; wherein the contextual data packets identify at least one structural hierarchy that is defined for the transmission of contextual information between voice-over-IP clients; wherein the contextual data packets and conversation data packets are transmitted over a same conversation channel during a voice-over IP call; wherein a payload identifier distinguishes the conversation data packets from the contextual data packets; based on the obtained set of user contextual information relating to the request for the desired service, identifying an additional set of user contextual information needed to provide the desired service; and
  selecting an information providing party where the additional set of user contextual information relating to the request for the desired service is to be obtained and obtaining the additional set of user contextual information relating to the request for the desired service from the selected information providing party over the packet-switched network.

2. The method of claim 1 further comprising:
  if the selected information providing party is the user, identifying a set of provider contextual information relating to the request for the desired service for collecting the additional set of information and transmitting the identified set of provider contextual information relating to the request for the desired service.

3. The method of claim 2, wherein the identified set of provider contextual information relating to the request for the desired service is utilized within devices of the user in order to retrieve the additional set of information.

4. The method of claim 2, wherein the identified set of provider contextual information relating to the request for the desired service corresponds to a first set of user interfaces, the first set of user interfaces being identified based on the obtained set of user contextual information relating to the request.

5. The method of claim 4 further comprising:
  in response to user interactions with the first set of user interfaces, collecting user contextual information relating to the user interactions.

6. The method of claim 5 further comprising:
  transmitting additional provider contextual information relating to the request for the desired service corresponding to a second set of user interfaces, the second set of user interfaces being tailored based on the collected user contextual information relating to the user interactions.

7. The method of claim 1 further comprising:
if the selected information providing party is a third party service provider, sending an inquiry for the additional user information to the third party service provider.

8. The method of claim 1 wherein the desired service is mutually authenticated with the user based on the user contextual information relating to the request for the desired service and if the desired service is not authenticated, the request to initiate a communication channel is rejected and the user is notified.

9. The method of claim 1, wherein the service provider is a Multi-language Call Center.

10. The method of claim 1, wherein the service provider is a VoIP service provider.

11. A method for identifying and collecting contextual information relating to a service over a digital communication channel between a client and a service provider, comprising:
obtaining, from a user of a packet-switched network, contextual data packets having a predetermined arrangement for providing a set of client's contextual information relating to a request for a desired service and to a request to establish a communication channel; wherein the contextual data packets identify at least one structural hierarchy that is defined for the transmission of contextual information between voice-over-IP clients; wherein the contextual data packets and conversation data packets are transmitted over a same communication channel during a voice-over IP call; wherein a payload identifier distinguishes the conversation data packets from the contextual data packets;
identifying at least one service by processing the obtained contextual data packets having a predetermined arrangement for providing the set of client's contextual information relating to the request for the desired service;
identifying a set of contextual information needed to provide the at least one service;
selecting an information providing party for obtaining the identified set of contextual information relating to the request for the desired service and obtaining the identified set of contextual information relating to the request for the desired service from the information providing party over the packet-switched network;
generating integrated client's contextual information needed to provide the desired service by combing the set of client's contextual information needed to provide the desired service obtained from the client over the packet-switched network and the set of client's contextual information needed to provide the desired service obtained from the information providing party over the packet-switched network; and
associating the integrated client's contextual information with the at least one service.

12. The method of claim 11, wherein the identified set of information includes client preferences relating to the at least one service.

13. The method of claim 11, wherein the identified set of information includes client specified rules relating to the at least one service.

14. The method of claim 11, wherein the identified set of information includes information relating to previous communications with the client.

15. The method of claim 11, wherein obtaining the identified set of contextual information relating to the request for the desired service includes filtering the client contextual information relating to the request for the desired service which is collected via user interfaces displayed on VoIP client devices.

16. The method of claim 15, wherein a set of provider contextual information relating to the request for the desired service and corresponding to the user interfaces is provided to the client.

17. The method of claim 11, wherein the integrated client's contextual information relating to the request for the desired service is reused for providing associated services for the client.

18. A computer-readable medium having computer-executable components for collecting contextual information over a digital communication channel between a user and a service provider, comprising:
an interface component for identifying contextual data packets having a predetermined arrangement for providing user contextual information needed by a service provider to provide a service requested by the user over a packet-switched network, wherein the contextual data packets identify at least one structural hierarchy that is defined for the transmission of contextual information between voice-over-IP clients; wherein the contextual data packets and conversation data packets are transmitted over a same communication channel during a voice-over IP call; wherein a payload identifier distinguishes the conversation data packets from the contextual data packets;
determining an information providing party for obtaining the identified user contextual information needed by a service provider to provide the request for the desired service, and obtaining the identified user contextual information needed by a service provider to provide the request for the desired service from the determined information providing party over the packet-switched network;
a routing component for determining a responding party for the user request and forwarding over the packet-switched network the obtained contextual data packets having a predetermined arrangement for providing user contextual information needed by the service provider to provide the desired service to the responding party; and
wherein the interface component transmits a request over the packet-switched network for obtaining the identified contextual data packets having a predetermined arrangement for providing user contextual information needed by the service provider to provide the desired service to the determined information providing party over the packet-switched network.

19. The computer-readable medium of claim 18, wherein the interface component detects and obtains changes in user contextual information relating to the request for the desired service.

20. The computer-readable medium of claim 19, wherein the routing component selects another responding party if the changes in user contextual information relating to the request for the desired service indicate undesirability of the responding party currently communicating with the user.

* * * * *